United States Patent [19]
Weiser

[11] Patent Number: 5,456,962
[45] Date of Patent: Oct. 10, 1995

[54] ICE GUARD FOR GROOVED TROLLEY WIRE

[76] Inventor: John K. Weiser, 3 Piper Rd., Lexington, Mass. 02173

[21] Appl. No.: 47,641

[22] Filed: Apr. 13, 1993

Related U.S. Application Data

[63] Continuation-in-part of Ser. No. 873,637, Apr. 23, 1992, abandoned, which is a continuation of Ser. No. 643,321, Jan. 22, 1991, abandoned.

[51] Int. Cl.⁶ ..................................................... B60M 1/13
[52] U.S. Cl. ........................... 428/99; 191/33 R; 191/62; 428/122
[58] Field of Search .................... 428/34.1, 99, 120, 428/122, 163; 52/147; 174/5 R; 191/30, 33 R, 62; 246/428

[56] References Cited

U.S. PATENT DOCUMENTS

| | | | |
|---|---|---|---|
| 1,765,823 | 6/1930 | Burke | 52/147 |
| 2,129,706 | 9/1938 | Richey | 191/30 |
| 2,564,386 | 8/1951 | Webb | 428/122 X |
| 3,133,984 | 5/1964 | Farough et al. | 174/5 R |
| 3,189,679 | 6/1965 | Scofield | 174/5 R X |
| 3,235,118 | 2/1966 | Kewley | 52/288 X |
| 3,900,697 | 8/1975 | Yotsugi | 52/147 X |
| 4,422,718 | 12/1983 | Nakagome et al. | 174/70 R X |
| 4,723,758 | 2/1988 | Gehrig | 428/122 X |
| 5,190,801 | 3/1993 | Charet et al. | 428/99 |
| 5,200,240 | 4/1993 | Baker | 428/34.1 |

Primary Examiner—Henry F. Epstein
Attorney, Agent, or Firm—Iandiorio & Teska

[57] ABSTRACT

An ice guard for a grooved trolley wire including a canopy supported on the wire by support members which extend inwardly from the canopy and are frictionally fit in the grooves of the trolley wire.

12 Claims, 2 Drawing Sheets

5,456,962

ICE GUARD FOR GROOVED TROLLEY WIRE

RELATED APPLICATIONS

This application is a Continuation-in-Part of Ser. No. 07/873,637 filed Apr. 23, 1992 (now abandoned), which is a Continuation application of Ser. No. 07/643,321, filed Jan. 22, 1991 (now abandoned), by the same inventor.

FIELD OF INVENTION

This invention relates to an improved ice guard for a grooved trolley wire, and specifically to such an ice guard which deflects sleet, rain, and melting ice away from the surface of the trolley wire and prevents the buildup of snow or ice on the top or bottom of the trolley wire while still allowing a current collector to make unimpeded contact with the bottom portion of the trolley wire.

BACKGROUND OF INVENTION

Some streetcars and electric locomotives obtain their power from a wire suspended above the rails, commonly referred to as a "trolley wire". A conventional trolley wire includes two grooves extruded along its length. The purpose of the grooves is to provide positive means to grip the wire for the purpose of suspending it above the trolley track so that nothing interferes with the bottom of the wire, allowing the current collector of the streetcar to freely travel there along.

In many climates, however, such as the northeast region of the United States, sleet and ice may form on the trolley wire in sufficient quantities to impair the transfer of electrical power from the trolley wire to the streetcar or locomotive.

SUMMARY OF INVENTION

It is therefore an object of this invention to provide an ice guard for a grooved trolley wire.

It is a further object of this invention to provide such an ice guard for a grooved trolley wire which protects the trolley wire from sleet and freezing rain while still allowing unimpeded contact between the current collector and the bottommost portion of wire.

It is a further object of this invention to provide such an ice guard for a grooved trolley wire which makes use of the grooves in the trolley wire to provide a friction fit between the ice guard and the grooved trolley wire.

It is a further object of this invention to provide such an ice guard for a grooved trolley wire which can be easily and inexpensively manufactured and which can be incorporated with the trolley wire without any need to modify the trolley wire itself.

It is a further object of this invention to provide such an ice guard for a grooved trolley wire which improves reliability and maintainability of winter operations on routes that employ overhead trolley wires as a source of vehicular energy.

This invention results from the realization that a canopy for diverting adverse weather elements from striking or accumulating on a trolley wire can be easily affixed to the trolley wire without the need for additional fasteners if it is configured with inwardly projecting members which are frictionally received in the existing grooves of a standard grooved trolley wire.

This invention features an ice guard for a grooved trolley wire which includes a canopy portion the apex of which straddles the upper portion of the wire and is maintained in that position by two inwardly projecting support members which are frictionally fit into the existing grooves of the wire. In this way, the guard is self-fastening and the bottom of the wire is left exposed for unimpeded current collection by a pantograph.

The canopy portion may include opposing side members depending downward over the wire from the apex and the side members may include the support members. In a preferred embodiment, the side members extend beyond the support members and include contoured portions which act as caves so that moisture falls clear of the wire, although this is not a limitation of the invention. Also, in a preferred embodiment, the canopy side members and support members are integral.

BRIEF DESCRIPTION OF THE DRAWINGS

Other objects, features and advantages will occur to those skilled in the art from the following description of preferred embodiments and the accompanying drawings in which.

DISCLOSURE OF PREFERRED EMBODIMENTS

Figure 1:
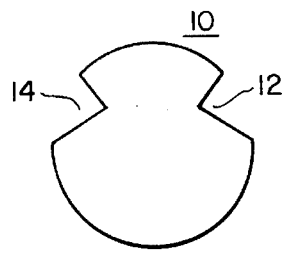
FIG. 1 is a schematic cross-sectional diagram of a grooved trolley wire.

As discussed in the Background of Invention above, there is a need to protect trolley wire 10, FIG. 1, while still allowing free access to the bottommost portion thereof by a current collector. The dimensions of grooved trolley wire 10 are standardized and are known as "American Standard Grooved Trolley Wire Sections". Wire 10 is usually copper, but also sometimes steel, and generally has a cross-sectional area of between 0.1083 to 0.2356 square inches. Grooves 12 and 14 vary in position and depth but generally have the shape shown in FIG. 1.

Figure 2:
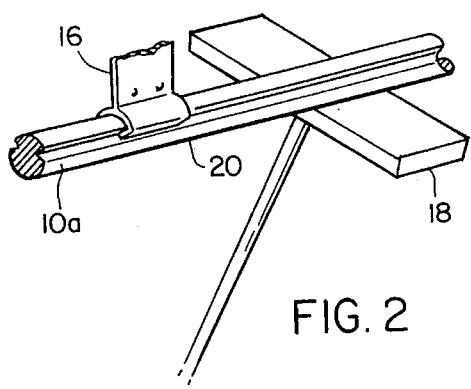
FIG. 2 is a schematic diagram of the grooved trolley wire of FIG. 1 shown in conjunction with a current collector which contacts the bottom portion of the grooved trolley wire.

Grooves 12 and 14, FIG. 1, are formed in trolley wire 10 so that clamp 16, FIG. 2, may be used to suspend the trolley wire 10a above the rail such that current collector 18 (pantograph) can travel freely along the bottom portion of the wire 20. The goal is to prevent any need for a wire suspension device which must circumferentially engage the wire because such devices would impede current collection or damage the current collector.

In this way, streetcars, electric locomotives, trolley cars, light rail vehicles, heavy rail coaches, combination diesel/ electric locomotives, electric buses, trolley buses, trackless trolleys, trains, and mining type locomotives receive power from electricity carried by grooved trolley wire 10a.

As delineated in the Background of Invention, above, however, if sleet, snow, or ice collects on trolley wire 10a, winter operations of electrically propelled rail vehicles that derive primary power from the overhead trolley wire 10a may be impaired, since the ice (a non-conductor of electricity) prevents electricity from actually reaching the vehicle.

Ice guard 22, however, acts as an umbrella to shield trolley wire 10b without interfering with the bottommost portion thereof 20a so that while adverse weather elements are deflected from trolley wire 10b, a current collector is still allowed to freely travel along the bottommost portion of trolley wire 20a.

Ice guard 22 includes a canopy portion 24 having an apex 26 and side members 28 and 30 depending downwardly therefrom. Opposing inwardly projecting support members 32 and 34 are frictionally fit into grooves 12a and 14a to maintain canopy portion 24 above and about the upper portion 36 of grooved trolley wire 10b.

Figure 3:
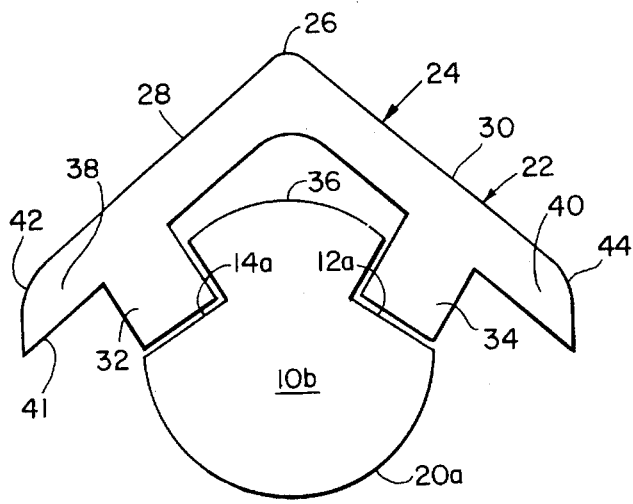
FIG. 3 is a schematic cross-sectional diagram of the ice guard for the grooved trolley wire of FIG. 1 according to this invention.

As shown in FIG. 3, the distal ends 38 and 40 of side members 28 and 30, respectively, extend past the support members 32 and 34 for urging adverse weather elements to fall clear of the wire. Contoured portions 42 and 44 of distal ends 38 and 40, respectively, redirect any adverse weather elements to fall clear of grooved trolley wire 10b, and also act as eaves so that moisture does not travel along the underside 41 of side member 28 and then along wire 10b.

Canopy portion 24 and support members 32 and 34 may be integral as shown in FIG. 3 and may be formed by extruding thermosetting or thermoplastic material in tenfoot or longer lengths. Metallic extrusion may also be acceptable provided that the effects of corrosion are addressed in the design. The actual dimensions of support members 32 and 34 will depend on the dimensions of grooved trolley wire 10b (2/0 AWG, 3/0 AWG, 4/0 AWG, and 300 MCM grooved trolley wire, and their metric counterparts, for example). Each length of ice guard 22 is placed above the wire and pressed into place. Thereafter, during the winter months, ice, sleet and snow will be prevented from collecting on trolley wire 10b, reliability and maintainability of electric vehicles will be improved, and maintenance operations reduced, resulting in considerable savings to the industry.

Obviously, ice guard 22 need not take the exact shape shown in FIG. 3: apex 26 can be rounded, side portions 28 and 30 could terminate at the junction of support members 32 and 34, and the clearance between the top portion 36 of grooved trolley wire 10b and apex portion 26 could be reduced or even eliminated.

Figure 4:
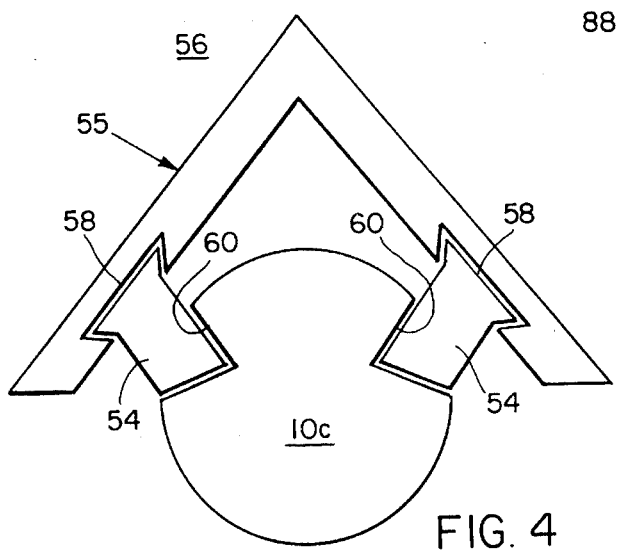
FIG. 4 is a schematic cross-sectional diagram of another embodiment of an ice guard for a grooved trolley wire according to this invention.

A-shaped canopy portion 55, FIG. 4, of guard 56 includes recesses 58. Support members 54 frictionally fit in both recesses 58 of canopy portion 55 and grooves 60 of trolley wire 10c. Support members 54 may extend continuously along the length of canopy portion 55 or, alternatively, may be discontinuous fingers pressed into canopy portion at regular intervals more particularly described with reference to FIG. 9 below.

Figure 5:
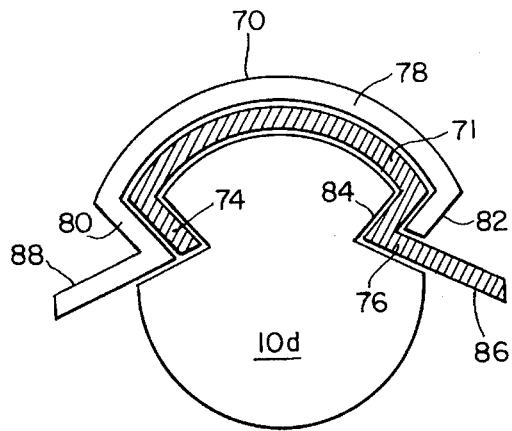
FIG. 5 is a schematic cross-sectional diagram of another embodiment of an ice guard for a grooved trolley wire according to this invention.

Two-piece canopy 70, FIG. 5, includes inner cap 71 which includes inwardly projecting support members 74 and 76. Outer cap 78 includes inwardly projecting support members 80 and 82. Support member 76 of inner cap 72 is received within groove 84 of trolley wire 10d and also includes a portion 86 which extends outwardly therefrom shielding the right half of trolley wire 10d as shown. Support member 80 of outer cap 78 includes a portion 88 which shields the left half of trolley wire 10d as shown. Inner cap 71 snaps over trolley wire 10d and outer cap 78 snaps over inner cap 71.

Figure 6:
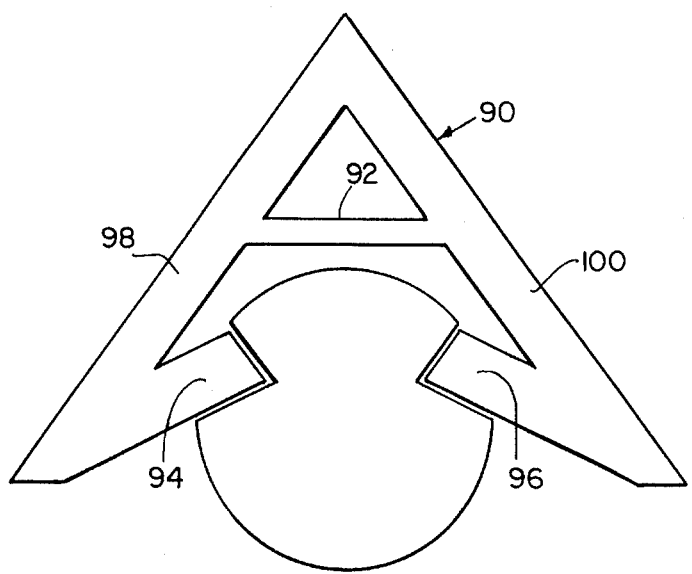
FIG. 6 is a schematic cross-sectional diagram of another embodiment of an ice guard for a grooved trolley wire according to this invention.
Figure 7:
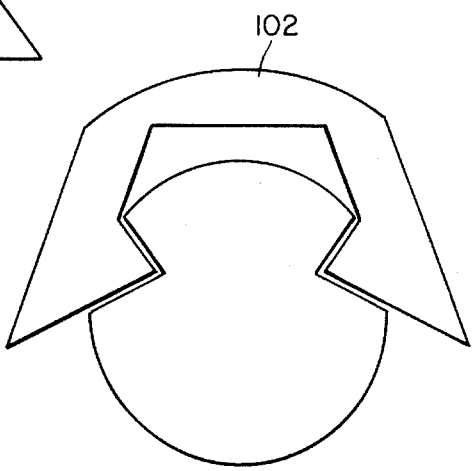
FIG. 7 is a schematic cross-sectional diagram of another embodiment of an ice guard for a grooved trolley wire according to this invention.
Figure 8:
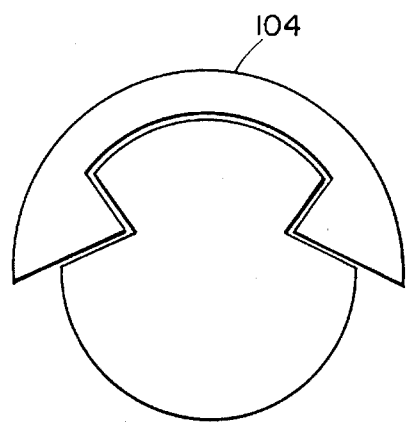
FIG. 8 is a schematic cross-sectional diagram of another embodiment of an ice guard for a grooved trolley wire according to this invention.

Canopy 90, FIG. 6, includes reinforcing rib 92 and opposing support members 94, 96, which extend inwardly from the bottom of side members 98, 100, respectively. Canopy 102, FIG. 7, is gambrel shaped while canopy 104, FIG. 8, is rounded, following the contour of the trolley wire.

Figure 9:
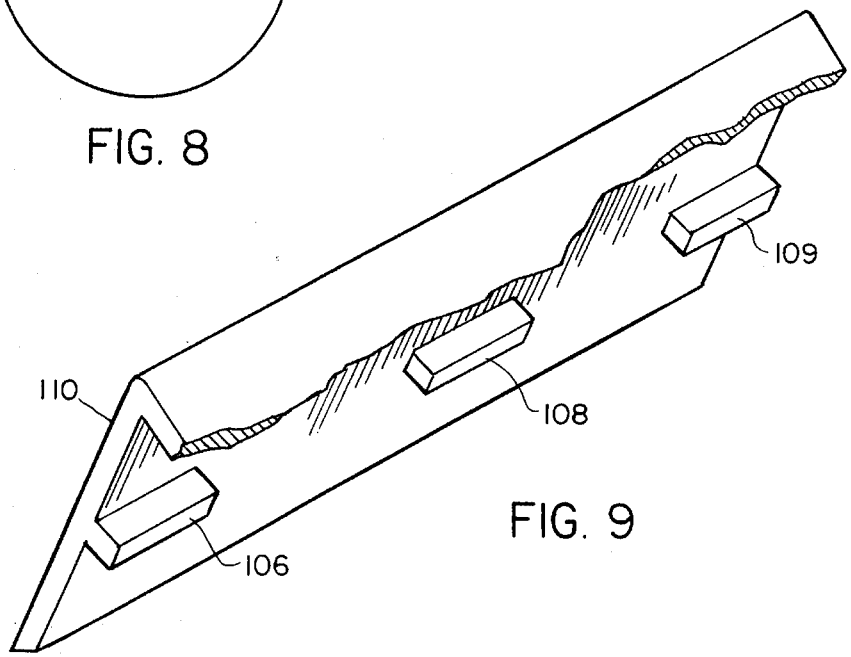
FIG. 9 is a schematic cross-sectional diagram of another embodiment of an ice guard for a grooved trolley wire according to this invention.

Discontinuous support members 106, 108, 110, FIG. 9, are shown on one side of canopy 110.

Therefore, although specific features of this invention are shown in some drawings and not others, this is for convenience only as each feature may be combined with any or all of the other features in accordance with the invention.

And, other embodiments will occur to those skilled in the art and are within the following claims:

What is claimed is:

1. An ice guard for a grooved trolley wire comprising:

a canopy portion having an apex for straddling the upper portion of the grooved trolley wire for shielding the grooved trolley wire against adverse weather elements while allowing free access to the bottom portion of the wire by a current collector; and opposing support members each extending inwardly from said canopy portion, each frictionally receivable by the grooves in the grooved trolley wire for maintaining said canopy about the upper portion of the grooved trolley wire.

2. The ice guard of claim 1 in which said canopy portion includes opposing side members depending from said apex.

3. The ice guard of claim 2 in which said side members include said support members.

4. The ice guard of claim 2 in which said side members extend beyond said support members.

5. The ice guard of claim 4 in which said side members include contoured portions on the ends thereof to redirect any adverse weather elements to fall clear of said wire.

6. The ice guard of claim 1 in which said opposing support members are continuous extending the length of said canopy portion.

7. The ice guard of claim 6 in which said support members include support members integral with said canopy depending inwardly therefrom.

8. The ice guard of claim 1 in which said opposing support members are discontinuous along the length of said canopy portion.

9. The ice guard of claim 1 in which said canopy portion includes an inner cap which frictionally fits over the upper portion of the trolley wire including a first extension portion which shields one side of the trolley wire; and an outer cap which frictionally fits over said inner cap including a second extension portion which shields the other side of the trolley wire.

10. An ice guard for a grooved trolley wire comprising:

a canopy portion for straddling the upper portion of the grooved trolley wire for shielding the grooved trolley wire against adverse weather elements while allowing free access to the bottom portion of the wire by a current collector; and support members, receivable by the grooves in the grooved trolley wire, for maintaining said canopy portion about the uppermost portion of the grooved trolley wire.

11. An ice guard for a grooved trolley wire comprising:

a canopy portion including an apex and two side members for straddling the upper portion of the grooved trolley wire for shielding the grooved trolley wire against adverse weather elements while allowing free access to the bottom portion by a current collector;

recesses formed in said side members; and support members, frictionally receivable within the grooves of the trolley wire and within said recesses of said side members for maintaining said canopy portion about the upper portion of the trolley wire.

12. The ice guard of claim 11 in which said support members include discontinuous fingers pressed into said side members along the length of said canopy portion.

* * * * *